United States Patent [19]

Renz et al.

[11] Patent Number: 5,197,720
[45] Date of Patent: Mar. 30, 1993

[54] CLAMPING TOOL FOR NON-POSITIVE AND HIGH-PRECISION CLAMPING OF WORKPIECES

[75] Inventors: Rainer Renz, Stuttgart; Johann Krämer, Leonberg, both of Fed. Rep. of Germany

[73] Assignee: Daimler-Benz AG, Fed. Rep. of Germany

[21] Appl. No.: 497,186

[22] Filed: Mar. 22, 1990

[30] Foreign Application Priority Data

Mar. 23, 1989 [DE] Fed. Rep. of Germany ....... 3909630

[51] Int. Cl.$^5$ .............................................. B23Q 3/14
[52] U.S. Cl. ..................................... 269/48.1; 269/285
[58] Field of Search ......... 269/48.1, 47, 48, 48.2–48.4, 269/49–52, 285, 329

[56] References Cited

U.S. PATENT DOCUMENTS

| | | | |
|---|---|---|---|
| 4,643,500 | 2/1987 | Krumme | 339/30 |
| 4,846,729 | 7/1989 | Hikami et al. | 493/161 |
| 4,899,543 | 2/1990 | Romanelli et al. | 60/527 |

FOREIGN PATENT DOCUMENTS

| | | |
|---|---|---|
| 2700934 | 7/1978 | Fed. Rep. of Germany. |
| 2518382 | 3/1980 | Fed. Rep. of Germany. |
| 3800696 | 7/1989 | Fed. Rep. of Germany. |

Primary Examiner—J. J. Swann
Attorney, Agent, or Firm—Evenson, Wands, Edwards, Lenahan & McKeown

[57] ABSTRACT

The invention concerns a clamping tool for non-positive and high-precision clamping of workpieces by means of an expansion element, which is held inside the clamping tool and, in the unclamped state, is matched to the workpiece with little play but movably, and to which force may be applied radially over a large area. When force is applied, the expansion element expands reversibly, and bears non-positively against the workpiece, and holds it in place with high rotational accuracy and high clamping force. In order to be able to permit a high expansion rate of the expansion element in conjunction with a closed configuration of the latter, the invention proposes for the expansion element a so-called shape memory alloy, which is operated in the austenitic state with reversible stress-inducible possibility of change of the microstructure into the martensitic state. For this reason, the workpiece can also be matched to the clamping tools with substantially coarser tolerances, and this has a favorable influence on the production costs.

13 Claims, 3 Drawing Sheets

CLAMPING TOOL FOR NON-POSITIVE AND HIGH-PRECISION CLAMPING OF WORKPIECES

BACKGROUND AND SUMMARY OF THE INVENTION

The invention concerns a clamping tool for non-positive and high-precision clamping of workpieces of the type generally described in German Offenlegungsschrift 2,700,934 or German Patent Specification 2,518,382.

Clamping tasks assume a particular significance in automatic finishing, especially in metal-cutting finishing. Clamping tools whose clamping force is transferred via a pressure medium and a radially deformable expansion bush or shrinking collar onto the workpiece have proved themselves for the precise accommodation of workpieces with central bores or cylindrical outer surfaces. With these, the generation of pressure can take place through manual or machine operation of a piston inside the clamping tool, and also through the introduction of pressure by a hydraulic unit. Clamping tools of this type are distinguished by a very good long-term rotational accuracy of less than two micrometers in conjunction with high clamping force. Another possibility for the radial deformation of the expansion element consists in pressing the expansion element axially against conical surfaces. These conical surfaces can be constructed in the form of a thread, whereby the wall thickness of the expansion element is the same in the entire region in the case of a cylindrical outer surface, and whereby, moreover, ease of mounting is provided. Clamping tools with this mechanical type of deformation of the expansion element also likewise exhibit good rotational accuracy, but because of the internal friction between the body and the expansion element they often do not attain the high precision of hydraulically operated clamping elements. The type of clamping tools mentioned here can be employed to manufacture both chucks and also mandrels. No details of their construction will be given in what follows, because these clamping tools are known per se. Moreover, the clamping tools described can also be used to clamp out-of-round workpieces, or to solve other clamping tasks. A rotationally symmetric construction of the clamping element is not in any way a basic precondition for the applicability of this type of clamping tool. The clamping surfaces can also be constructed flat, to be precise when the tools likewise have flat bearing surfaces. Again, it is advantageously possible to realize permanent clamping connections in the sphere of machine elements such as bearings or shaft/hub connections with expansion elements of this type. A disadvantage of the previously described clamping tools or clamping connections consists in the only relatively slightly possible change in diameter of the expansion element. The maximum permissible change in diameter is determined by the maximum reference stress still permissible, which develops during deformation of the expansion element upon generation of the clamping force. It is customary for the expansion element to be manufactured from steel. In order to guarantee as long a service life as possible, or as high as possible a number of clampings that can be carried out by means of the clamping tool, the maximum permissible change in diameter of the expansion element may amount to only approximately three parts per thousand of the clamping diameter. A reliable clamping can therefore be attained only if the workpieces or the tools to be clamped are manufactured to a satisfactorily high quality of fit. In many instances, to meet these demands means substantial extra cost, especially in the case of small clamping diameters. Certainly, in the case of mechanically generated clamping force it is possible to realize a sizeable expansion rate by axial slotting of the expansion element, but this takes place at the expense of the rotational accuracy.

It is also known (cf. German Offenlegungsschrift 3,800,696) to manufacture the expansion elements of fibre composites in the clamping tools of the type under discussion. In this way, one certainly obtains a clamping tool which is distinguished by a permissible change in diameter of up to approximately 1%, that is to say by an expansion rate which is more than three times as high by comparison with expansion elements made of steel. However, a disadvantage of this construction is a relatively poor rotational accuracy, which is determined by the manufacture and caused by irregularities in the fibre flow during the production process; furthermore the transfer of force between the body and the expansion element presents problems. The unavoidable error in rotational accuracy amounts here to approximately five times the error in rotational accuracy attainable with steel expansion elements. In addition, sealing problems remain to be considered with this type of construction, and with hydraulic operation. The very poor wear resistance of the expansion element consisting of plastic likewise stands in the way of a wide application.

It is an object of the invention further to develop the clamping tools of the above-described types, which have metallic expansion elements and are distinguished by a high rotational or centering accuracy, high wear resistance and high clamping force, so that the requirements relating to the accuracy of fit of the bearing surfaces on the workpiece side or of the clamping surfaces on the workpiece side can be kept substantially smaller than previously.

This object is achieved according to the invention by providing an arrangement wherein the expansion element consists of an alloy with shape-memory capacity, the alloy composition being chosen so that the region of the reversible, stress-inducible austenitic/martensitic microstructural transformation, also termed pseudoelastic or superelastic region, occurs at the service temperature of the clamping tool.

According to the invention, the expansion element is manufactured from metal alloys with shape-memory capacity. Alloys of this type are known per se. The core of the invention resides in using this type of alloy in an advantageous fashion for the expansion elements of the generic clamping tools. The alloy composition for the expansion elements is chosen so that so-called pseudoelasticity occurs in the working temperature range of the clamping tool—normally room temperature. Above a critical temperature, which depends upon the composition of the memory alloy, materials with shape-memory capacity exhibit a substantially higher reversible ductility of the order of magnitude of approximately 8% by comparison with steel, with a maximum of three parts per thousand, or by comparison with other metallic alloys, with a maximum of approximately five parts per thousand. A further advantage of these alloys consists in the available basic strength and hardness of the material which it exhibits despite the enormous elasticity. Satisfactory machinability by metal cutting and satisfactory weldability of the alloy represent further advantageous properties, which first render possible a sensible use of this material to manufacture expansion elements for clamping tools operated hydraulically or mechanically. Additional corrosion protection is mostly not required, because many of these alloys are corrosion-resistant by their nature. In order to increase the resistivity with respect to abrasive wear, the expansion element can additionally be provided with a wear-resistant coating. In so doing, care must be taken to ensure that the coating adheres satisfactorily at the maximum target expansion rate of the expansion element. Candidates here are, for example, chemical nickel coatings, or microporous coatings deposited by a plasma process, or coatings deposited by a PVD or CVD process, or by a plasma nitration process, or coatings deposited by an ion implantation process. The last-named processes have the advantage that the introduction of ions into the crystal lattice produces defects which lead to compressive stresses in the region of the surface and thereby contribute to increasing the endurance strength under alternating stress.

The hardness and strength of an alloy with shape-memory capacity is comparable to steel or other usual materials. In the case of nickel-titanium alloys, apart from excellent corrosion properties and good fatigue strength, for the application according to the invention particular interest attaches furthermore to the very high reversible deformation properties with respect to the austenitic/martensitic phase transformation. An additional point is that with this type of alloy, the transformation temperature can be virtually freely adjusted between the martensitic and austenitic microstructure in the range from $-100°$ C. to $+100°$ C. through an appropriate alloy composition.

Other objects, advantages and novel features of the present invention will become apparent from the following detailed description of the invention when considered in conjunction with the accompanying drawings.

BRIEF DESCRIPTION OF THE DRAWINGS

The invention is further explained below with reference to different illustrative embodiments represented in the drawings, wherein.

DETAILED DESCRIPTION OF THE DRAWINGS

The stress-strain diagrams of known shape-memory alloys exhibit a strong dependence on a particular temperature. This is associated with the fact that martensitic or austenitic microstructures can occur in the alloy, depending upon temperature. Depending upon the type of microstructure, the stress-strain behavior of the alloy is different. Even given an austenitic microstructure, the alloys exhibit different behavior depending upon temperature. To be precise, there is a temperature range in which superelasticity or pseudoelasticity occurs: this effect is lost in a temperature range above the superelasticity or psuedoelasticity temperature range.

Figure 1:
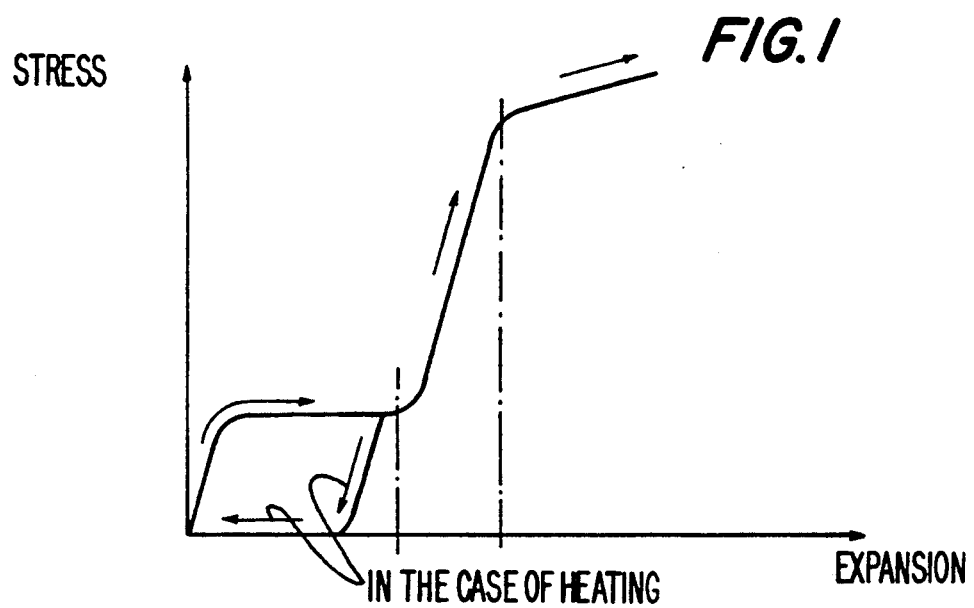
FIGS. 1 to 3 show three different basic diagrams of the stress-strain curve of shape-memory alloys in different temperature ranges.

The stress-strain behavior of shape-memory alloys reproduced in FIG. 1 corresponds to the so-called low-temperature range in which martensitic microstructure occurs. When a component such as a clamping tool is loaded in this temperature range, with increasing load there is firstly a rapid linear increase in the expansion in conformity with Hook's Law. Lasting deformations occur at a specific stress value. However, these deformations can be reversed by warming the component. Due to the warming, the alloy passes temporarily into the austenitic state; this is designated as memory property. As long as the alloy is maintained, depending upon temperature, in the austenitic state, and as long as the alloy is not held by external mechanical influences, the component shrinks back into the initial state. After cooling, the alloy once again assumes a martensitic microstructure.

The alloy behaves differently when loaded in the temperature range in which austenitic microstructure occurs, to be precise an austenitic microstructure capable of stress-induced transformation. In the state of load represented in FIG. 2 the expansion also firstly increases linearly with increasing load. Above a limiting stress value, the component can be expanded within relatively wide limits without appreciable increase in stress, i.e. superelastically or pseudoelastically. However, after unloading of the component this expansion once again immediately returns to a hysteresis curve along the curve designated by the lower arrow in FIG. 2. The component can be expanded up to approximately 8% in the austenitic state of this type; in a few places the literature mentions alloys in which an expansion of up to 12% is supposedly possible.

Figure 3:
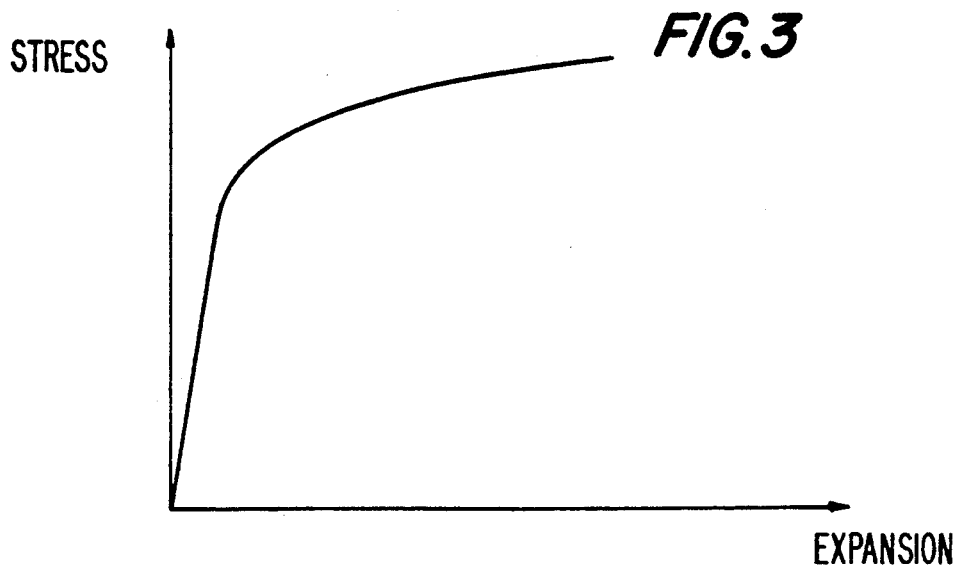

Above the temperature range which has just been discussed, there is, finally, an austenitic microstructure in which stress-induced microstructural transformations are no longer possible. In this higher temperature range, which holds for the diagram according to FIG. 3, the alloy exhibits normal stress-strain behavior with a steep linear increase in stress and elastic expansion in conformity with Hook's Law, and increasingly lasting deformation in the case of further increase in load, which is no longer reversible. In this raised temperature range, the alloy no longer has any pseudoelastic behavior.

Nickel-titanium base alloys, copper base alloys and iron base alloys may be mentioned as essential representatives of suitable shape-memory alloys. In the case of the nickel-titanium base alloys, copper and/or iron can also be alloyed in the order of magnitude of approximately 10%. In the case of the copper base alloys, tin is often employed as essential alloying constituent, it being possible for aluminum also to be alloyed. A further type of copper base alloys contains aluminum in a relatively high concentration and nickel as a smaller constituent. In the case of iron base alloys, nickel is often provided as the second strongest alloy constituent, it being possible for aluminum also to be alloyed as third alloying constituent, possibly in combination with titanium. Another iron/nickel alloy of this type contains cobalt and titanium. A further iron base alloy employs manganese and silicon. Finally, iron base alloys are also further known in which platinum or palladium are also alloyed, and this naturally makes this alloy very expensive. The iron base alloys have been developed for economic savings.

Figure 4:
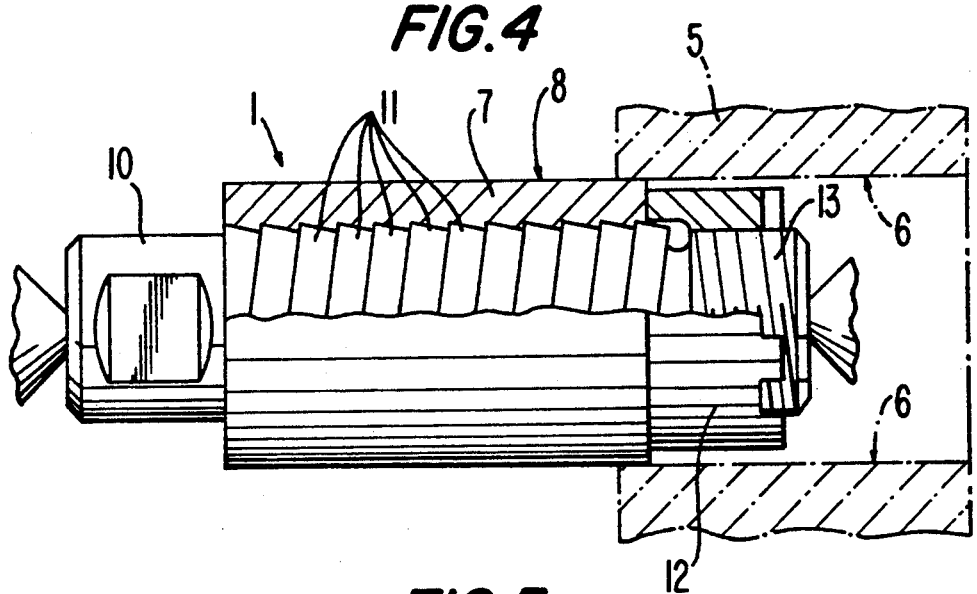
FIGS. 4 to 6 show three different illustrative embodiments of mandrels with expansion elements, constructed according to the present invention.
Figure 5:
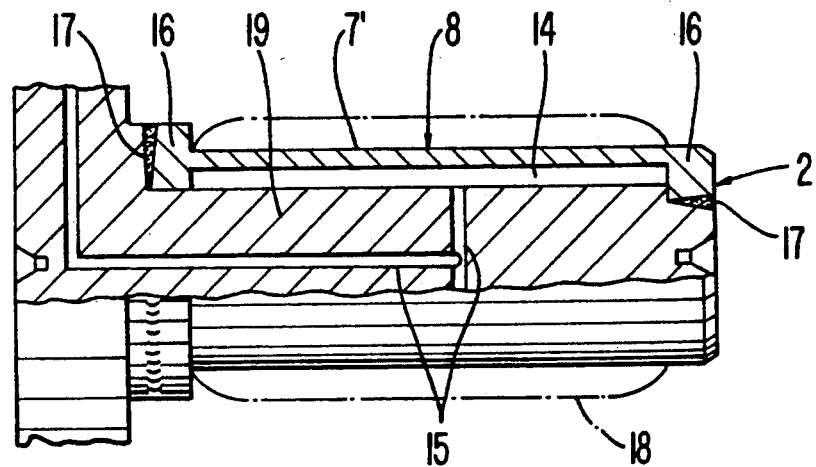
Figure 6:
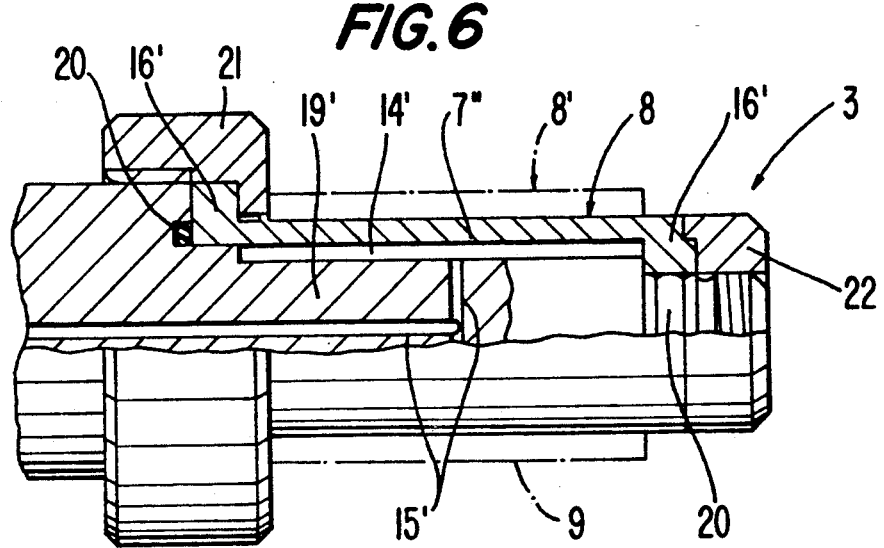
Figure 7:
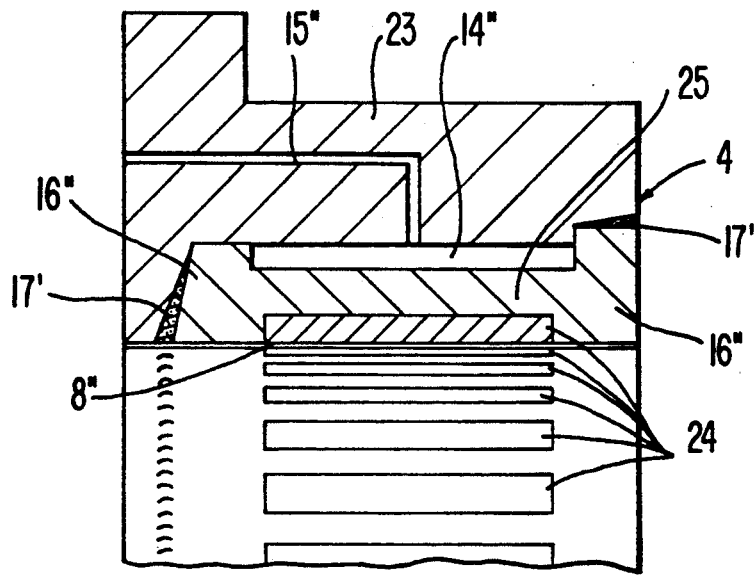
FIG. 7 shows an illustrative embodiment of a chuck with shrinking collar and inserted strips of hard material, constructed according to the invention.

In essence, the present invention represents the employment of such shape-memory alloys for clamping tools of the type represented in FIGS. 4 to 7, to be precise for the expansion elements employed therein. These clamping tools 1, 2, 3 or 4 serve a frictional and high-precision clamping of workpieces 5 at machined, preferably rotationally symmetrical bearing, surfaces 6 of the workpiece. The clamping tools represented in FIGS. 4 to 6 are constructed as mandrels in which a respective sleeve-shaped expansion element 7, 7', 7" is held on a pin 10 (FIG. 4) or on a holding mandrel 19, 19' (FIGS. 5 and 6) in a known manner. The illustrative embodiment of a clamping tool represented in FIG. 7 is constructed as a chuck 4 comprising a shape-memory alloy expansion element 25 constructed as a shrinking collar and held inside a pot-type chuck body 23. The chuck 4 serves for precisely clamping workpieces with external cylindrical bearing faces. In the region in which they come into contact with the workpiece 5, as seen, for example, in FIG. 4, the expansion elements 7, 7', 7" and 25 of the different clamping tools are precisely machined and formed to a shape which is complementary to the corresponding bearing surfaces 6 of the workpiece. The surfaces of the clamping tool which have been machined in this way will be designated below as clamping surfaces 8 (FIGS. 4 to 6) and 8" (FIG. 7), respectively. In an unclamped state of the expansion element, the clamping surfaces 8, 8" of the clamping tool match the bearing surfaces 6 of the workpiece with little play but nevertheless movably, by virtue of an appropriate precise finishing. On a side of the expansion element opposite the clamping surfaces 8 and 8", respectively, the expansion elements can have a force applied to them over a large area constituted by the surface of the opposite side transverse to the clamping surface in such a way that the wall of the expansion element 7, 7', 7" or 25 is reversibly deformed, and the clamping surface 8, 8" is pressed against the bearing surface 6 of the workpiece 5 and in so doing clamps the workpiece frictionally in place. The various illustrative embodiments differ from one another essentially in the type of force application, i.e. how the expansion element is held inside the clamping tool. It is common to all the illustrative embodiments that the expansion element 7, 7', 7" or 25 consists of a shape-memory alloy whose alloy composition is chosen such that the austenitic state, sketched in FIG. 2, of the shape-memory alloy occurs at a temperature at which the clamping tool is to be used, in which state the alloy exhibits a superelastic (or pseudoelastic) behavior, i.e. wide expansion without appreciable stress increase. Upon application of force, the expansion element 7, 7', 7" can be relatively strongly, possibly up to 8%, expanded in diameter, and can just as rapidly return once again to its initial state after unloading. Consequently, workpieces with relatively poor tolerances can also be clamped frictionally and with precision with high rotational accuracy and high clamping force. Due to the rapidly introducible forces caused by attainment of the austenitic state, equally rapid deformations can be caused at the expansion element 7, 7', 7", and the workpieces can accordingly be rapidly clamped or unclamped. A similar statement also applies to the chuck 4 according to FIG. 7.

Figure 2:
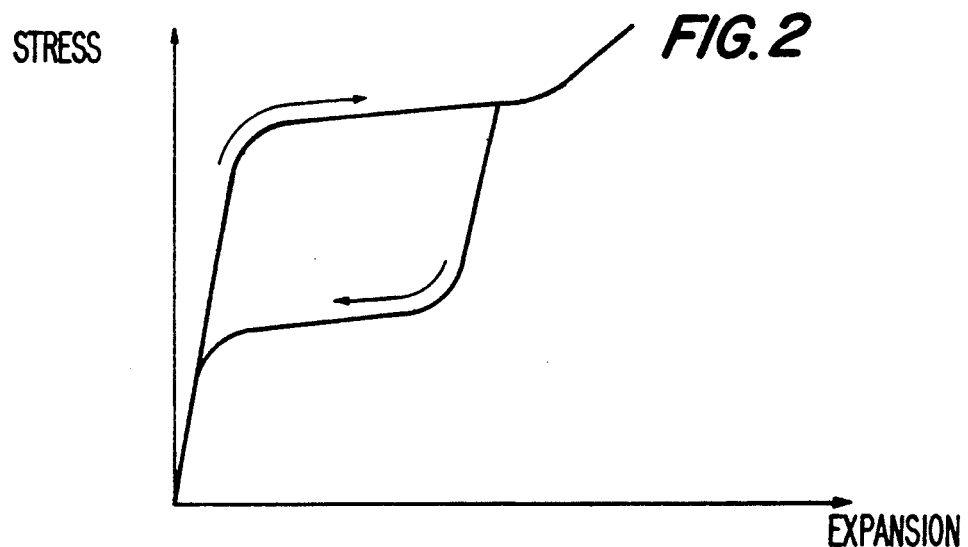

The shape-memory alloy of the expansion element 7, 7', 7" or 25 is composed so that—in the case of frequent repetition, e.g. of 50,000 clampings—a reversible expansion of at least 0.5%, preferably of at least 1% of the type shown in FIG. 2, is possible. Nickel-titanium base alloys are suitable for this purpose, it is also further being possible for copper and/or iron to be alloyed. With an alloy of this type, it was possible to obtain diametrical expansions of up to 10% in a ring by pressing a cone with a 30° taper therein, without causing a lasting deformation at the ring after unloading.

In the illustrative embodiment of a mandrel represented in FIG. 4, the expansion force directed transverse to the clamping surface 8 is applied mechanically. To be precise, the pin 10, which is held between centers in a known manner, has a series of small, slim cones integrally formed axially behind one another, but not, however, representing peripherally separate individual cones. These cones merge into one another with their conical surfaces on the pin 10 in the manner of a continuous conical thread 11 whose thread profile is strongly asymmetrically constructed, having a shallow inclined thread flank and a steep thread flank. A corresponding, nut-type thread is sunk in on the inside of the expansion element 7, so that the sleeve-like expansion element 7 can be screwed onto the conical thread 11 of the pin 10. The shallow inclined thread flanks of the expansion element 7 are arranged on that side of the thread profile which faces a threaded journal 13 at an end of the pin 10, and on which journal 13a clamp nut 12 can be screwed. With this clamp nut 12 on the threaded journal 13, the expansion element 7 can be pushed onto the inclined-flanks of the conical thread 11 of the pin 10 and subject to a force due to the conical action over the entire length and on the entire periphery. As a result of this force, which is directed transverse to the clamping surface 8 and is applied mechanically, the expansion element 7 is expanded and, consequently, the workpiece 5 which has been pushed on is clamped in place by the mandrel 1.

In the illustrative embodiment of a mandrel 2 represented in FIG. 5, the force directed transverse to the clamping surface 8 is hydraulically applied to expand the expansion element 7'. To be precise, the expansion element 7' is fastened pressure-tight on the holding mandrel by welds 17, and this presupposes that the materials of the expansion element 7' and of the holding mandrel 19 can be welded to one another. A hollow cylindrical pressure chamber 14 is arranged inside the expansion element 17' and to which a force can be applied by fluid pressure via a pressure channel 15 from an external pressure source. The terminating edges of the expansion element 7' are provided at the end face with rim swellings 16; the expansion 7' is welded to the holding mandrel 19 in the region of these rim swellings 16. These welds are directed or arranged in such a way that the weld root does not merge directly into the pressure chamber 14, but is covered by material of the holding mandrel 19. Consequently, no welding splashes or metal vapors can pass into the interior of the pressure chamber 14. The rim swellings 16 eliminate uneven radial expansion of the expansion element 7' in the region where it is fastened to the holding mandrel 19, and thereby guarantees that the expansion element expands evenly in the radial direction. In the illustrative embodiment represented in FIG. 5, the deformation line 18 of the expansion element 7' is represented—although greatly exaggerated—in the case of pressurization of the pressure chamber 14, and without the workpiece having been pushed on, the expansion element 7' would not expand so strongly, but bear in advance with a corresponding force against the bearing surface 6 of the workpiece and produce there a high friction clamping connection between the clamping surface 8 and bearing surface 6.

In the illustrative embodiment according to FIG. 6, the expansion element 7″ is likewise expanded hydraulically; a pressure chamber 14′ and pressure channels 15′ are likewise arranged interiorly of the holding mandrel 19′. However, the expansion element 7″ is detachably connected to the holding mandrel 19′ and sealed against it by means of seals 20 in the region of the rim swellings 16′. This configuration is needed if the materials of the expansion element 7″ and of the holding mandrel 19′ cannot be welded to one another, or if replacement of the expansion element is to be possible for reasons relating to wear or the like. Serving to join the expansion element reliably in the sealing and clamping region are, on the one hand, a cap nut 21 and, at the other end of the expansion element 7′, a pressure nut 22 which is screwed onto a threaded journal 20 of the holding mandrel 19′. Both the cap nut 21 and also the pressure nut 22 at least partially overlap the rim swellings 16′ so that in the region of the rim swellings 16′ the expansion element 7′ is also restrained from expanding radially by the corresponding nuts 21, 22. Moreover, in the illustrative embodiment of the mandrel 3 represented in FIG. 6 there is, further, a representation of the possibility of being able to use the mandrel with a larger diameter workpiece with the aid of a pushed-on bush 9 with a clamping surface 8′. This bush 9 can also be made of a shape-memory alloy. Of course, it is also conceivable to manufacture this bush from normal steel and to slot it axially repeatedly in the longitudinal direction alternating from one end face to the other, so that due to these expansion slots the steel bush can expand sufficiently. However, experience has shown that such a bush 9 is used with another workpiece, some peripheral slippage occurs between the opposed contact surfaces of the bush 9 and workpiece, and such a slippage may impair rotational accuracy for automatic finishing operations. At least a portion of the region of the clamping surface 8 or 8′ in the embodiment of FIG. 6 can be provided with a permanently fastened layer or coating of wear-resistant material in the form, for example, of fine particles of a hard material. Since the layer or coating is very thin, it is represented in FIG. 6 by the lines consituting the outer boundary of clamping surfaces 8, 8′.

In the case of the chuck 4 shown in FIG. 7, the clamping force is likewise transferred hydraulically to the collar-type expansion element 25. Here too, a pressure chamber 14″ and pressure channels 15″ are provided in the chuck body 23. The expansion element 25 is welded in the region of the rim swellings 16″ to the chuck body 23 by means of welds 17′, the root area of which is covered. Given application of pressure to the pressure chamber 14″, the expansion element 25, which is constructed in the form of a shrinking collar, is radially compressed and bears with its clamping surface 8″ externally against a corresponding cylindrical bearing surface of a workpiece and holds the workpiece securely in place in conjunction with high rotational accuracy and high clamping force. Again, in this illustrative embodiment the possibility is also represented of increasing the wear resistance of the expansion element 25 in the region of the clamping surfaces 8″. To be precise, surface-covering strip-shaped parts 24 made of hard-wearing material are recessed in the expansion element 25. These shaped parts can be made, for example, of ceramic or of hard metal. Reference has already been made further above to the possibility of improving the expansion element with a wear-resistant surface layer or coating, and this is especially useful in the case of smaller expansion elements, in which it is more difficult to embed the shaped parts well in the material of the expansion element.

Figure 8:
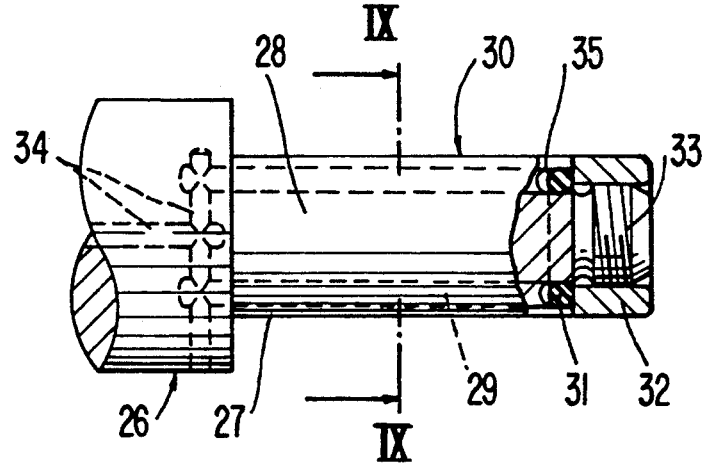
FIGS. 8 and 9 show an elevation (FIG. 8) and cross-section (FIG. 9) of a further illustrative embodiment of the invention, to be precise of a mandrel consisting entirely of a shape-memory alloy.
Figure 9:
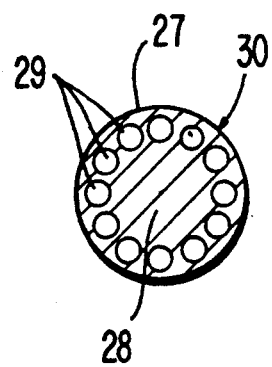

In the embodiment of a mandrel 26 according to FIGS. 8 and 9, the expansion element 27 forms, with a supporting core-like backing body 28, a single one-piece continuous member which is produced from a solid piece by putting a circularly arranged group of bores 29, with small peripheral spacing between the bores, at a small spacing from the clamping surface 30. Here the entire mandrel 26 consists of a shape-memory alloy of the aforementioned type. In the case of the illustrative embodiment, the bores 29 are bored from the free end face of the mandrel 26, the open side of the bores then being closed by an annular slot of approximately square cross-section at the free end face of the mandrel 26. An elastic toroidal sealing ring 31 is tightly pressed into the annular slot. The ring 31 is axially secured with a nut 32 which is screwed onto a threaded journal 33 fitted on the free end of the mandrel. Further, a small groove 35 connects the bores 29 fluidically to one another in the peripheral direction and is axially arranged in the base of the slot. Pressure channels 34 are provided in the left-hand side of the holder of the mandrel 26 in FIG. 8, through which fluid pressure can be directly applied to at least two diametrically opposite bores 29; such a pressure can also spread rapidly via the above-mentioned groove 35 into the other bores 29. When pressure is applied to all bores 29, the expansion element 27 is curved outwards at least at the sites of the smallest wall thickness between bore 29 and the clamping surface 30; the clamping surface 30 therefore assumes a wave-like form in the peripheral direction in the pressurized state of the mandrel 26. When the bores 29 have a very narrow mutual peripheral spacing, and when the web remaining between them, which web has a biconvex shape in cross-section perpendicular to the axis, is very narrow, the region of the clamping surface between two bores will also be displaced outwards when pressure is applied, so that as a whole the expansion element 27 will diametrically expand. Depending upon whether the bores 29 have a lesser radial spacing from the clamping surface 30 or a lesser peripheral spacing from the neighboring bore, the wave-like deformation of the clamping surface or the expansion in the diameter of the clamping surface 30 will predominate. By skillful arrangement of the bores, it is also possible to apply or utilize these two types of deformation in combination according. The advantage of the one-piece mandrel 26 resides in a relatively simple design, and seems to be specially suitable for clamping tasks on smaller workpieces. The decisive fact here is that the bores 29 are fitted precisely as to their position, and the remaining cross-sections between them and towards the clamping surface 30 are the same size for all bores, so that when pressure is applied the same deformations result at all sites.

Figure 10:
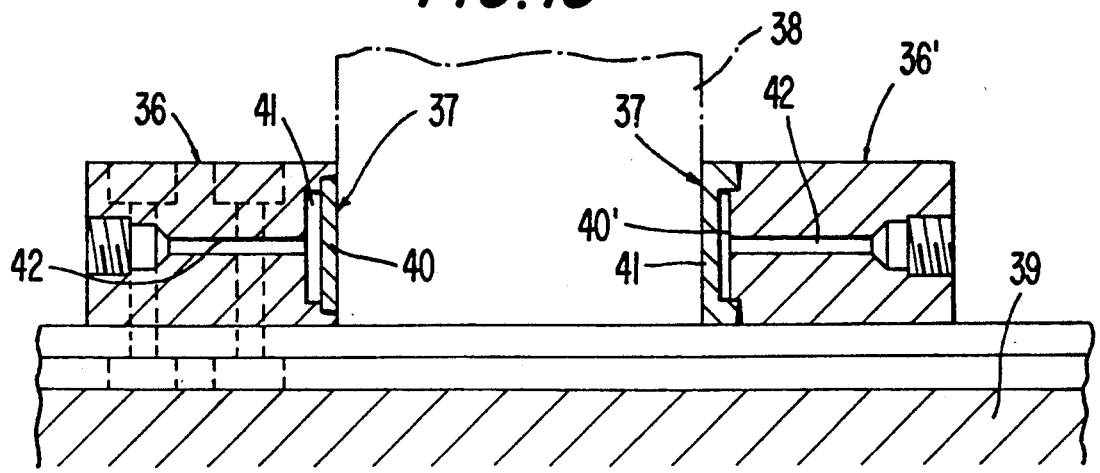
FIG. 10 shows clamping tools with flat clamping surfaces, constructed according to the invention.

The illustrative embodiment according to FIG. 10 shows clamping tools 36 and 36′ with flat clamping surfaces 37 for clamping an essentially square-shaped workpiece 38, for example on a work-holding table 39. The clamping tools 36 and 36′, respectively, which are essentially likewise square-shaped, are positioned on the work-holding table 39 in accordance with the dimensions of the workpiece and clamped in place there by screws. An expansion element 40 or 40' made of a shape-memory alloy is welded onto a flat side of the clamping tools 36, 36', which flat side faces the workpiece 38. A pressure chamber 41, to which fluid pressure can be applied via a pressure channel 42, is arranged in underneath the expansion element 40, 40'. The workpiece 38 can be held in place, as with a vice, between the clamping tools 36, 36' on the work-holding table 39 in conjunction with high reproducible clamping accuracy and clamping force. After relief of pressure on the expansion elements 40, 40', the workpiece can be rapidly replaced. Instead of one of the two clamping tools 36, 36', it is also possible, of course, to clamp a stationary jaw in place on the work-holding table 39, and to undertake active clamping of the workpiece only from one side.

For the sake of completeness, it may be pointed out in conclusion that the retaining force of the clamping tools at the workpieces can be increased by permanently fastening fine particles made of a hard material to the clamping surfaces of the clamping tools. At issue here are diamond dust, ceramic or corundum dust or hard metal dust. The dust grains have an irregular and sharp-edged external contour. Preferably, they are of the same order of magnitude, or they are only slightly larger than the surface roughness of the clamping surface. Permanent fastening can be done by joining with adhesive, by blasting on in a gas jet, or by incorporating dust grains into the alloy and etching the surface free. With the rough surface created in this way, the clamping surface of the clamping tool digs itself into the bearing surface of the workpiece in the selected area, thus holding it in place all the more securely. Moreover, due to the incorporation of hard fine particles into the clamping surface, the latter is more resistance to abrasive wear.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Clamping tool for frictional, high-precision clamping of a workpiece at defined machined bearing surfaces of the workpiece, comprising a metallic expansion element configured with a region of precisely machined clamping surfaces so as to come into contact with the workpiece in a clamped state, as a complementary shape of the bearing surfaces of the workpiece, and in an unclamped state, the clamping surfaces are sized relative to the bearing surfaces of the workpiece to minimize minimum play therebetween, and to which on a rear side of the metallic expansion element opposite the clamping surfaces force is applied over a large area transverse to the clamping surfaces such that a wall of the metallic expansion element is reversibly deformed and the clamping surfaces bear against the bearing surfaces of the workpiece to clamp the workpiece frictionally in place, wherein the expansion element is an alloy composition with shape-memory capacity such that a region of reversible stress-inducible austenitic/martensitic microstructural transformation occurs at a temperature at which the clamping tool is used for clamping the workpiece.

2. Clamping tool according to claim 1, wherein a bush is covering the expansion element and has a diameter matched to other workpiece dimensions, which bush is made of an alloy with shape-memory capacity.

3. Clamping tool according to claim 1, wherein the alloy composition of the expansion element is chosen so that a reversible expansion of between 0.5% and 1% is possible in the case of frequent repetition of clamping operation.

4. Clamping tool according to claim 1, wherein the expansion element consists of a nickel-titanium base alloy.

5. Clamping tool according to claim 4, wherein the nickel-titanium base alloy also further contains at least one of copper and iron.

6. Clamping tool according to claim 1, wherein the expansion element consists of a material selected from the group consisting of copper base alloy, zinc, zinc and aluminum, and aluminum and nickel.

7. Clamping tool according to claim 1, wherein the expansion element is an iron base alloy.

8. Clamping tool according to claim 7, wherein the iron base alloy is alloyed with nickel.

9. Clamping tool according to claim 8, wherein the iron base alloy is alloyed with aluminum.

10. Clamping tool according to claim 9, wherein the iron base alloy is alloyed with titanium.

11. Clamping tool according to claim 8, wherein the iron base alloy is alloyed with cobalt and titanium.

12. Clamping tool according to claim 7, wherein the iron base alloy is alloyed with manganese and silicon.

13. Clamping tool according to claim 7, wherein the iron base alloy is alloyed with one of platinum and palladium.

* * * * *